United States Patent
Tyrrell et al.

(10) Patent No.: US 10,375,589 B2
(45) Date of Patent: Aug. 6, 2019

(54) MOBILE COMMUNICATION TEST DEVICE AND A CORRESPONDING METHOD

(71) Applicant: Rohde & Schwarz GmbH & Co. KG, München (DE)

(72) Inventors: Alexander Tyrrell, Ismaning (DE); Thiago Moraes, München (DE); William Powell, München (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 9 days.

(21) Appl. No.: 15/094,966

(22) Filed: Apr. 8, 2016

(65) Prior Publication Data

US 2017/0295507 A1    Oct. 12, 2017

(51) Int. Cl.
| | | |
|---|---|---|
| H04B 17/14 | (2015.01) | |
| H04B 17/18 | (2015.01) | |
| H04W 24/06 | (2009.01) | |
| H04B 17/00 | (2015.01) | |
| H04W 88/10 | (2009.01) | |

(52) U.S. Cl.
CPC ........ *H04W 24/06* (2013.01); *H04B 17/0085* (2013.01); *H04B 17/14* (2015.01); *H04B 17/18* (2015.01); *H04W 88/10* (2013.01)

(58) Field of Classification Search
CPC ..... H04W 24/00; H04W 24/04; H04W 24/06; H04W 24/10; H04W 88/06; H04L 12/2697
See application file for complete search history.

(56) References Cited

U.S. PATENT DOCUMENTS

| | | | | |
|---|---|---|---|---|
| 2005/0267715 A1* | 12/2005 | Kolu | ..................... | H04W 24/06 702/189 |
| 2010/0304686 A1* | 12/2010 | Kennedy | ............... | H04W 24/00 455/67.11 |
| 2012/0052816 A1* | 3/2012 | Chang | .................. | H04W 24/06 455/67.12 |
| 2013/0064117 A1* | 3/2013 | Hashimoto | ........... | H04W 24/06 370/252 |
| 2014/0242976 A1* | 8/2014 | Suenaga | ............... | H04W 24/06 455/423 |
| 2015/0067417 A1* | 3/2015 | Olgaard | ................ | H04W 24/06 714/712 |
| 2015/0264590 A1* | 9/2015 | Michl | ................ | H04B 17/0085 455/67.14 |
| 2017/0093509 A1* | 3/2017 | Kyosti | ............... | H04B 17/3911 |

* cited by examiner

*Primary Examiner* — George Eng
*Assistant Examiner* — Umair Ahsan
(74) *Attorney, Agent, or Firm* — Shumaker & Sieffert, P.A.

(57) ABSTRACT

A mobile communication test device for testing a mobile user equipment comprises a number of transmit-receive units with a signal generator, wherein the signal generator of at least one transmit-receive unit generates test signals, which rep-resent at least two different communication partners of the mobile user equipment, a number of test interfaces, which connect the transmit-receive units with the mobile user equipment and transmit the test signals to the mobile user equipment, and a test processor, which analyzes the reaction of the mobile user equipment to the transmitted test signals based on a predefined test specification.

16 Claims, 13 Drawing Sheets

MOBILE COMMUNICATION TEST DEVICE AND A CORRESPONDING METHOD

TECHNICAL FIELD

The invention relates to a mobile communication test device and a corresponding method.

BACKGROUND

In LTE (long term evolution) and UMTS (universal mobile telecommunications system), the mobile telecommunication devices a user carries are denoted as user equipment or shortly UE. Hereinafter, the present invention and its underlying problem are described on the basis of such user equipment, however, without restricting the invention to this sort of devices.

In particular, the term user equipment should be used in the context of this application explicitly for any radio-based mobile or wireless end-to-end communication device, such as a cell phone, a smart computer, a laptop computer equipped with a mobile broadband adapter or the like.

The evolution of modern telecommunication standards, like e.g. defined by the 3GPP provides an increasing number of functions in modern user equipment. The functions of such user equipment have to be tested, e.g. during development or after production. If a user equipment is tested in a real environment, such as a real radio communications network, the conditions are often not reproducible due to the limiting conditions such as cell capacity, timing, utilization, or the like.

Therefore, user equipment should be tested in a reproducible test environment. For this purpose, dedicated test apparatus—also denoted as test devices or test instruments—for testing such user equipment exist. The increasing amount of functions of the UEs allows testing only a subset of the functions with simple test equipment or requires very complex test apparatuses, which can cover all those functions.

Accordingly, there is a need for more flexible test equipment.

SUMMARY

A mobile communication test device for testing a mobile user equipment comprises a number, i.e. one or more, of transmit-receive units with a signal generator, wherein the signal generator of at least one transmit-receive unit generates test signals, which represent at least two different communication partners of the mobile user equipment. The test device further comprises a number, i.e. one or more, of test interfaces, especially one test interface for every transmit-receive unit, which connects the transmit-receive units with the mobile user equipment and transmits the test signals to the mobile user equipment. Finally, the test device also comprises a test processor, which analyses the reaction of the mobile user equipment to the transmitted test signals based on a predefined test specification, and e.g. provides an indication of whether the mobile user equipment conforms to the predefined test specification.

A mobile communication test method for testing a mobile user equipment comprises generating test signals, which represent at least two different communication partners of the mobile user equipment, e.g. with a transmit-receive unit, transmitting the test signals to the mobile user equipment, e.g. with a number of test interfaces, which connect the transmit-receive units with the mobile user equipment, and analyzing the reaction of the mobile user equipment to the transmitted test signals based on a predefined test specification, and e.g. providing an indication of whether the mobile user equipment conforms to the predefined test specification.

A test device is in principle an RF test station, which can in one example be seen as a modified small transceiver base station of a mobile communications network or in another example as a user equipment. The test apparatus can emulate a specific test network according to the required mobile communications standard such as for example a GSM, UMTS or LTE network, such that the test can be performed under realistic conditions.

This type of test device is used in order to test the RF properties of a user equipment under test, for instance its transmit and receive capability, or whether a particular user equipment is behaving as required, for example with regard to data throughput, data volume, communications partners, like servers, or the like.

More and more communication is related to communication in a mixed cellular and Device-to-Device (D2D) communications environment. In particular, D2D communication has been promoted as a means to provide peer-to-peer services between user equipment, to facilitate infrastructure-less communications in emergency situations and to enhance network capacity by offloading traffic from the radio communications network, i.e. the base stations.

Therefore, in the test device the transmit-receive units cannot only emulate a base station but any communication partner of a mobile equipment, like e.g. other mobile equipment in a D2D scenario. Because communications can take place between a plurality of devices the test signals of different communication partner can e.g. be generated in a timely distributed fashion or the test signals can e.g. be generated with different frequencies.

Summing up, the present invention allows using single transmit-receive units to generate test signals, which represent different communication partners to a test equipment.

Further embodiments of the present invention are subject of the further subclaims and of the following description, referring to the drawings.

In a possible embodiment, the test interfaces can comprise a configurable radio frequency, RF, unit, which transforms the test signals generated by the signal generator into RF signals at a configurable frequency, a configurable modulation or the like. Thus, one single RF unit can be used to generate test signals, which represent different communication partners at different frequencies, modulations or the like.

In a possible embodiment, at least one of the test interfaces can comprise a signal receiver, which receives signals generated by the mobile user equipment and transmits the received signals to the respective transmit-receive unit. Recording or supervising the RF signals, which the mobile equipment under test generates, is one way of analyzing the reaction of the mobile user equipment to the test signals, In a possible embodiment, the signal receiver is embodied in the radio frequency, RF, unit, of the test interface and can transform RF signals received from the mobile user equipment into digital data signals and forward said digital data signals to the respective transmit-receive unit.

In a possible embodiment, the mobile communication test device comprises a number of configurable logic devices, e.g. FPGAs, CPLDs or the like, especially mixed mode configurable logic devices with digital and analogue sections (also referred to as RF sections in this document), which each comprise at least on transmit-receive unit and/or at least one test interface. Using a configurable logic device with digital and analogue sections allows very flexibly configuring the transmit-receive units test interfaces.

In a possible embodiment, the mobile communication test device can comprise a configuration memory, which stores a number of configurations for the configurable logic devices, which when loaded into one of the configurable logic devices cause the respective configurable logic device to generate test signals for a specific communication partner of the mobile user equipment. Such configurations can quickly be loaded into the configurable logic device while the test device is running.

In a possible embodiment, the mobile communication test device can comprise a configuration processor, which periodically reconfigures the configurable logic device based on one of the configurations, and based on a configuration schedule, which can e.g. be provided in the test specification. Therefore, signals for different communication partners of the mobile user equipment can easily be generated during execution of a test.

In a possible embodiment, the configurable logic device can comprise a permanently configured, e.g. at start-up of the mobile communication test device, digital section, which comprises at least one transmit-receive unit, and a configurable analogue section and/or RF section, which is periodically configured based on one of the configurations. The digital section can e.g. comprise the logic to generate digital test signals for a plurality of different communication partners of the mobile user equipment. The analogue section and/or RF section can then for every emulated communication partner be quickly adapted to e.g. convert the digital test signal into a RF signal at a predetermined frequency, a predetermined modulation or the like.

In some test scenarios, reoccurring signals from a plurality of different communication partners need to be generated. This can e.g. be the case for Direct Discovery or Direct Communication messages in LTE networks. Therefore, in a possible embodiment, the configuration processor can periodically reconfigure a digital and/or an analogue section of the configurable logic device according to the predefined configurations.

In a possible embodiment, the configurations can comprise first configuration data for a digital section of the configurable logic device and second configuration data for an analogue and/or RF section of the configurable logic device, wherein the configurations cause the configurable logic device to generate test signals at different frequencies and/or at different points in time and/or with different content, different modulations or the like. With such configurations the digital and the analogue sections are configured at the same time and the complete functionality of the configurable logic device is replaced or adapted.

In a possible embodiment, one configuration can comprise first configuration data for a digital section of the configurable logic device, which when loaded into the configurable logic device causes the digital section of the configurable logic device to generate digital test signals for different communication partners of the mobile user equipment. Such a simple configuration allows the digital section to function as an emulator of a plurality of different communication partners.

In a possible embodiment, a number of the configurations can comprise second configuration data for an analogue section of the configurable logic device which when loaded into the configurable logic device cause the analogue section of the configurable logic device to transform the digital test signals into analogue test signals at different frequencies. In combination with the abovementioned configuration, which allows the digital section to function as an emulator of a plurality of different communication partners, the configurations allow the configurable logic device to emit RF signals e.g. at different frequencies, modulations or the like, depending on the respective configuration.

In a possible embodiment, the signal generator of at least one transmit-receive unit can generate test signals of a number of cell phone network base stations, i.e. the respective configuration configures the respective transmit-receive unit to emulate or simulate said base station.

In a possible embodiment, the signal generator of at least one transmit-receive unit can generate test signals of a number of user equipments, i.e. the respective configuration configures the respective transmit-receive unit to emulate or simulate a mobile user equipment, especially Direct Discovery messages or Direct Communication messages, e.g. according to 3GPP Release 12 or higher.

Simulating one or more base stations and one or more further user equipment allows extensive simultaneous testing of user equipment to base station communication and user equipment to user equipment communication (e.g. Direct Discovery or Direct Communication), which are features of modern wireless communication standards, like e.g. 3GPP release 12.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Figure 1:
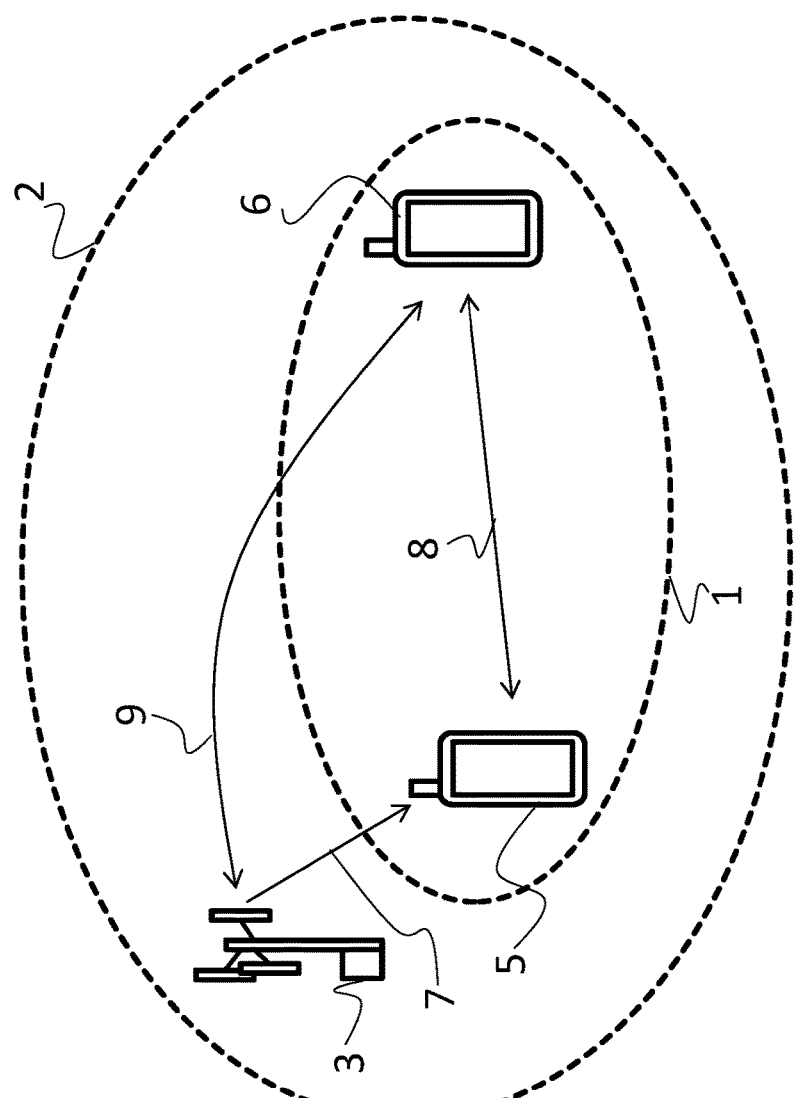
FIGS. 1-4 schematically show four different mixed communication scenarios.
Figure 2:
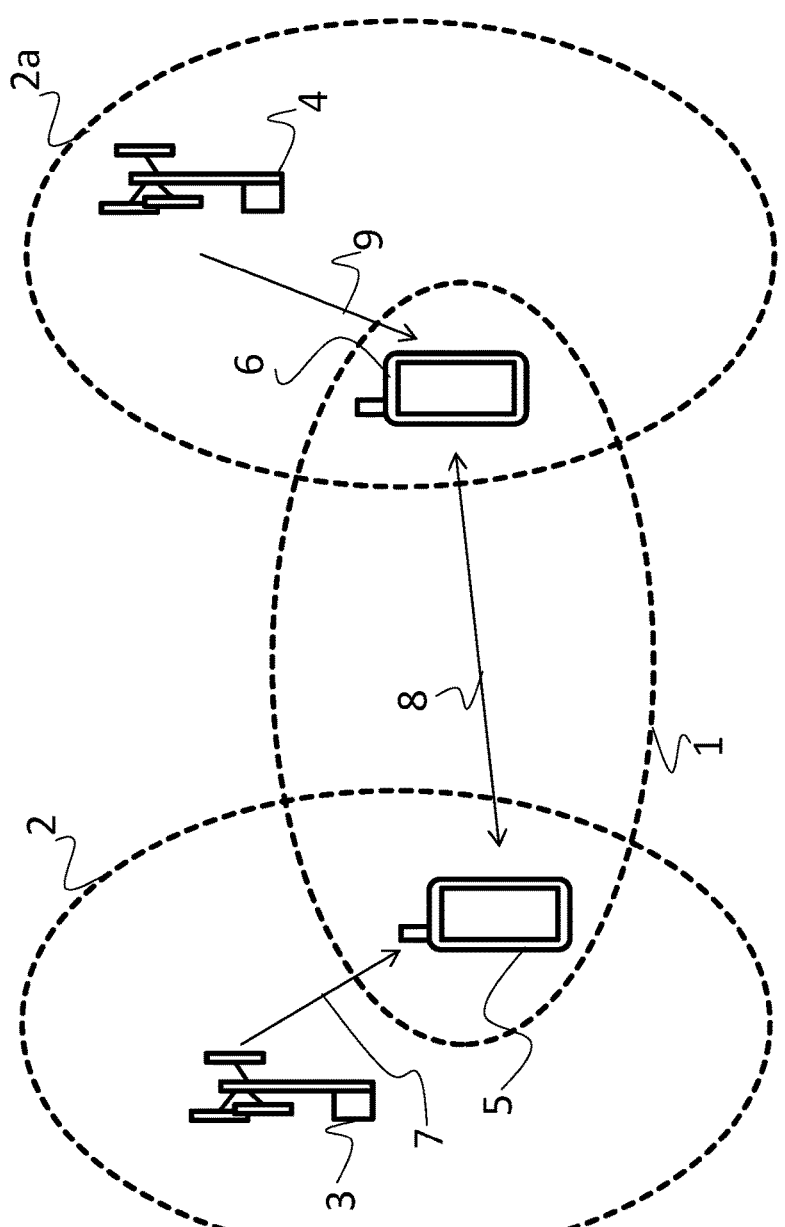
Figure 3:
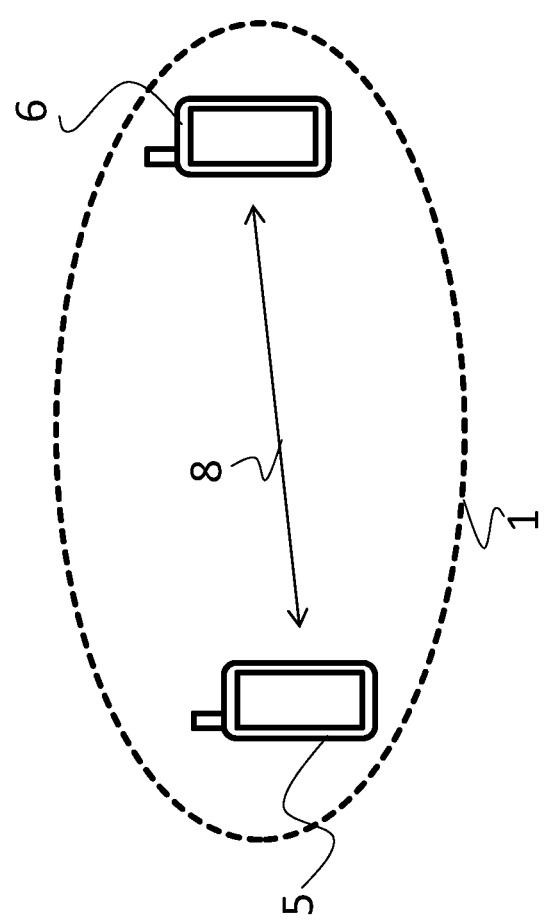
Figure 4:
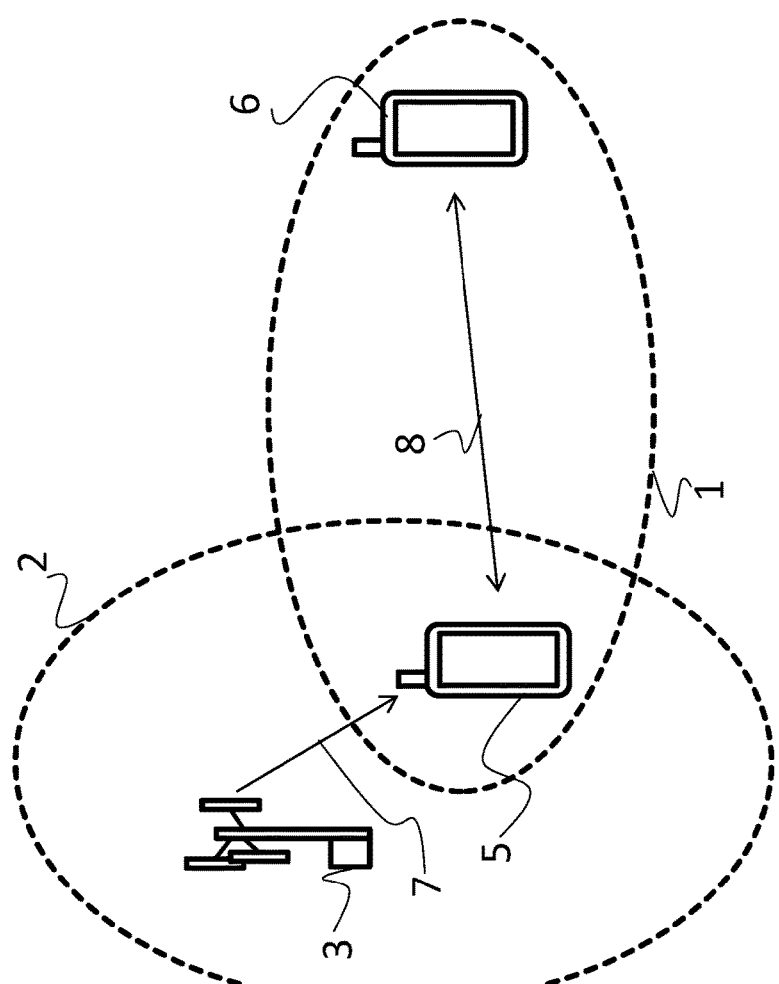

The enclosed drawings are intended to provide further under-standing of the embodiments of the invention. They illustrate embodiments and, in conjunction with the description, serve to explain principles and concepts of the invention. Other embodiments and many of the stated advantages can be found from the drawings. The elements of the drawings are not necessarily shown in scale with one another.

In the figures of the drawing, any elements and components that are identical, have the same function and work in the same way, are each given the same reference signs, unless stated otherwise.

DETAILED DESCRIPTION OF THE DRAWINGS

FIG. 1-4 depict—as examples—four different mixed communications scenarios with which embodiments of the present invention may be implemented. The mixed communications scenario comprises a D2D (Device to Device) radio network 1 and a cellular communications network 2, i.e. a mix of the D2D radio network 1 and the cellular communications network 2.

The D2D radio network 1 is a communication network wherein two or more user equipments 5, 6 or other devices, in the examples in FIGS. 1-4 a first user equipment 5 and a second user equipment 6, communicate directly with each other and not via the cellular communications network 2. One such example is a network using a master-and-slave concept, such as e.g. a Bluetooth system. Another example is a D2D radio network based on LTE. The D2D radio network 1 may be used to provide peer-to-peer services between user equipments 5, 6, facilitate infra-structure-less communications in emergency, and the like. The D2D radio network 1 is established by two user equipments 5, 6 which are communicating with each other.

The cellular communications network 2 is established via at least one radio transceiver base station 3, 4. The cellular communications network 2 is a cellular communication network such as an LTE, WCDMA, UMTS, GSM network, or any other cellular communications network. These networks may comprise base stations of different classes, such as macro base stations, home base stations or pico base stations.

The first and second user equipment 5, 6 may be a terminal, e.g. a mobile terminal or a wireless terminal, a mobile phone, a computer such as e.g. a laptop, Personal Digital Assistant (PDA), or any other radio network unit capable to communicate over a D2D link and over a radio link in a cellular communications system. Typically, but not necessarily, both first and second user equipment 5, 6 are capable of both communications, i.e. "macro" communications in the cellular communications network 2 and "local" D2D communications in the D2D radio network 1.

In the present patent application the term "D2D communication" shall refer "direct discovery" as well as "direct communication". "direct discovery" is related to the exchange of pre-known, predefined and fix messages and data. "direct communication" is related to a flexible data communication, wherein the direct communication between the devices is performed in so called sidelink (SL) control channels and a sidelink data channels.

In embodiments where the D2D radio network 1 uses a master-and-slave concept, one of the communicating user equipments 5, 6 takes the master role and closely emulates a base station such as LTE eNB. For example, the second user equipment 6 may be a master device and the first user equipment 5 may be a slave device, however, it may also be the other way around.

According to a first mixed communications scenario (FIG. 1), both user equipments 5, 6 are comprised in the cellular communication networks 2. This scenario is hereinafter referred to as in-coverage, intra cell communication as both user equipments 5, 6 are fully comprised in the same cellular communications network 2. The first user equipment 5 is configured to communicate within the cellular communications network 2 via the base station 3 over a radio link 7 when the first user equipment 5 is present in a cell served by this base station 3. The base station 3 may e.g. be a radio base station such as an eNB, eNodeB. The first user equipment 5 is further arranged to communicate with the second user equipment 6 over a D2D radio link 8 within the D2D radio network 1. The second user equipment 6 may further be connected to the cellular communication system 2 via a connection 9. This connection 9 may serve for coordination of the whole communication.

According to a second mixed communications scenario (FIG. 2), the user equipments 5, 6 are comprised in different cellular communications network 2, 2a and thus connected to different base stations 3, 4. This scenario is hereinafter referred to as in-coverage, inter-cell communication. Here, the first user equipment 5 is arranged in a first cellular communications network 2 and communicates with a first cellular communications network 2 via radio link 7. A second user equipment 6 is arranged in a second, different cellular communications network 2a and communicates with the second cellular communications network 2a via connection 9. The user equipments 5, 6 are configured to communicate with each other via the D2D radio link 8.

According to a third mixed communications scenario (FIG. 3), both equipments 5, 6 are arranged outside any cellular communications network. This scenario is hereinafter referred to as out-of-coverage communication. Here, both user equipments 5, 6 are arranged only within the D2D radio network 1. This D2D radio network 1 may be established by the first user equipment 5, the second equipment 6 or both of them. Thus, both user equipments 5, 6 are connected to each other only via the D2D radio link 8.

According to a fourth mixed communications scenario (FIG. 4), the first user equipment 5 is comprised in the cellular communications network 2 and the second user equipment 6 is comprised outside the cellular communications network 2. This scenario is hereinafter referred to as partial coverage communication. In this scenario, the second user equipment 6 is connected to the first user equipment 3 only via the D2D link 8. The first user equipment 5 is further connected to the base station 3 via the radio link 7.

The above scenarios show two user equipments 5, 6. It is to be understood, that any number of user equipments is possible in a Direct Discovery and/or Direct Communication scenario.

To test the capabilities and standard conformance of a user equipment in such scenarios a test device according to the present invention can be used.

Figure 5:
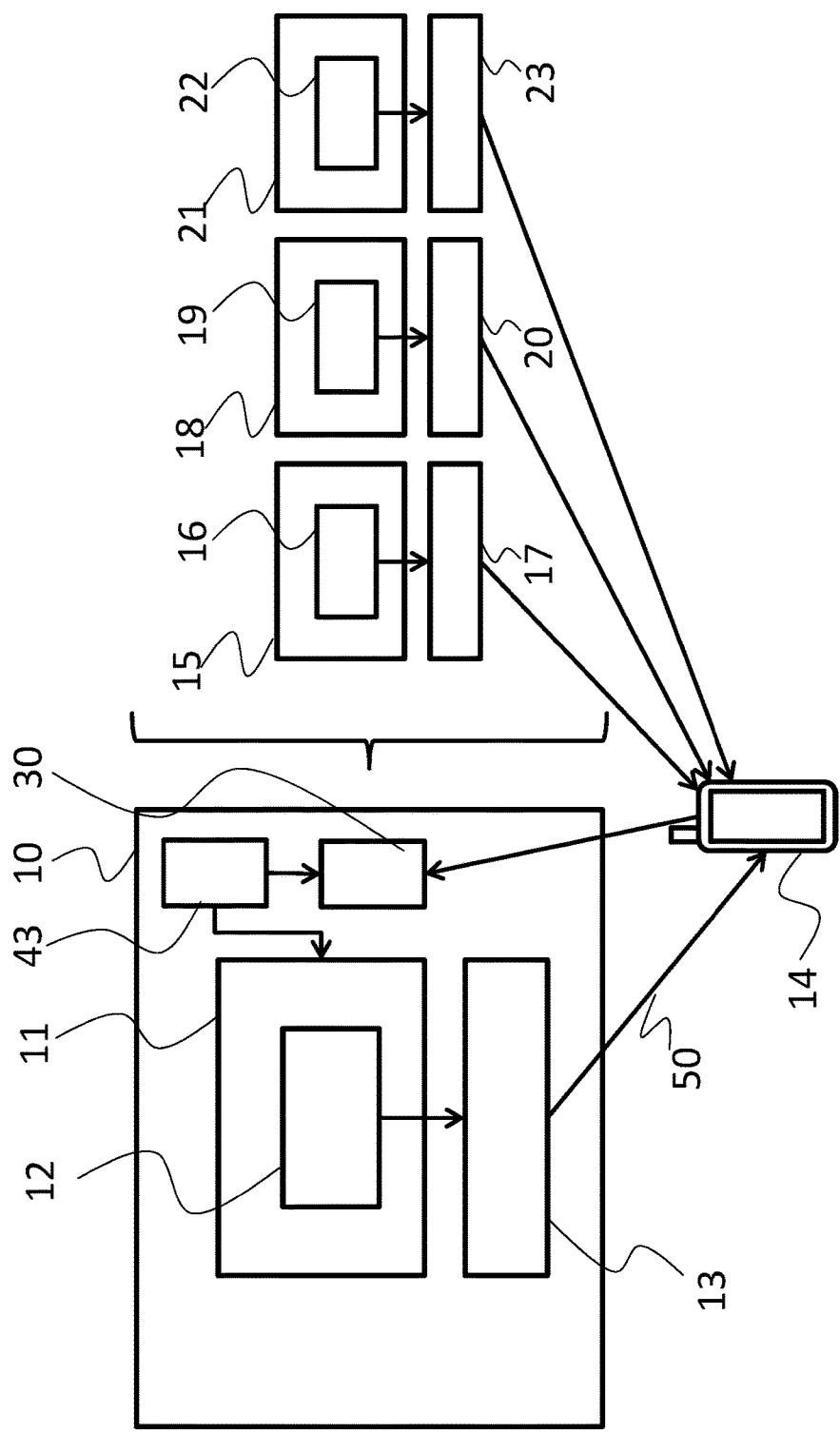
FIG. 5 schematically shows a block diagram of an embodiment of a test device according to an embodiment of the present invention.

The test device 10 of FIG. 5 comprises a transmit-receive unit 11 with a digital signal generator 12. The signal generator 12 generates data packets 24, 25, 26 (see FIGS. 6 and 7) and provides the data packets 24, 25, 26 to a test interface 13, which transforms the digital data packets into RF data packets and transmits the data packets 24, 25, 26 to a mobile device under test 14, also called DUT (device under test).

The signal generator 12 is capable of generating the data packets 24, 25, 26 according to the 3GPP release 12 Standard. The signal generator 12 can especially generate the data packets 24, 25, 26 to comprise the system information blocks, SIBs, which are relevant for a specific test scenario, like e.g. SIB18 and/or SIB19 blocks. The data packets 24, 25, 26 are then transferred via wired or/wireless connection 50 to the DUT 14.

If e.g. direct discovery or direct communication capabilities of a DUT are to be tested, the signal generator can generate the relevant SIBs as the data packets 24, 25, 26 for a plurality of different other mobile devices, e.g. respective SIB19 messages. That means that the DUT 14 will receive the SIBs from the other mobile devices, which in reality do not exist. The other mobile devices are mere emulations or "virtual mobile devices", which are provided by the signal generator 12. It is to be understood, that the signal generator 12 cannot only generate data packets 24, 25, 26 for a plurality of different other mobile devices, but also for other entities, like e.g. base stations or the like.

In FIG. 5 a test processor 30 is included in the test device 10, which will monitor the reaction of the DUT 14 to the data packets 24, 25, 26 and analyze the reactions according to a test specification 43.

The test specification 43 also comprises information about the data packets 24, 25, 26, which the signal generator 12 will provide. This information can e.g. be in the form of configurations 34, 34a, 35, 35a, 36, 36a (see FIGS. 10 and 11), which are sequentially loaded into the signal generator 12.

In FIG. 5 the signal generator 12 generates data packets 24, 25, 26 for three different mobile devices. By loading in a timely distributed manner different configurations into the signal generator 12 and/or the test interface 13, to the DUT 14 it appears as if there were three different virtual transmit-receive units 15, 18, 21. Further, each one of the signal generators 15, 18, 21 comprises a separate virtual signal generator 16, 19, 22 and the respective test interface 17, 20, 23.

As can be seen in FIG. 5 the present invention allows to provide with a single transmit-receive 11 unit and with a single test interface 13 signals, which represent a plurality of different communication partners for the DUT 14.

The person skilled in the art will know, that the number of three virtual transmit-receive units 15, 18, 21 is only exemplary and that any number of virtual communication partners can be emulated in the transmit-receive unit 11. The number of communication partners is only limited by the time it takes to reconfigure the transmit-receive unit 11 and the test interface 13 and the number of messages from different entities, which should be transmitted in a certain period.

Figure 6:
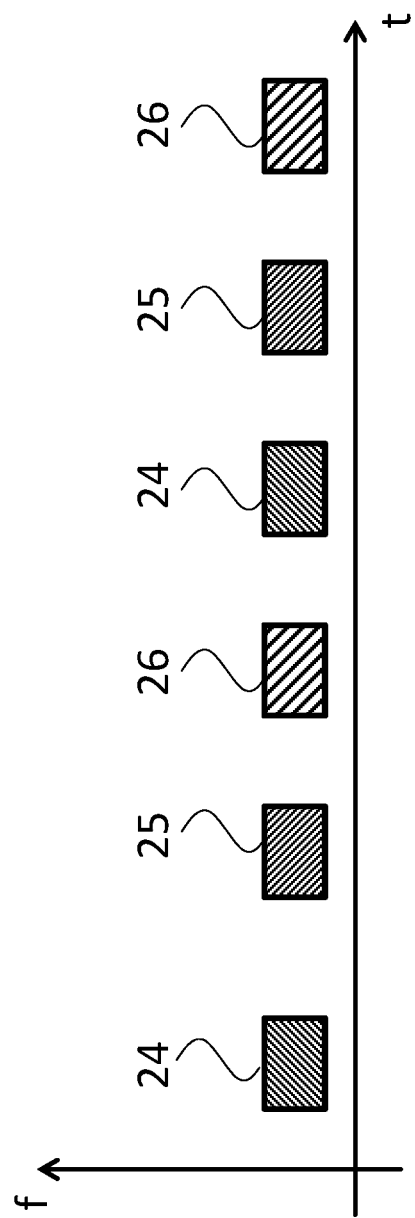
FIG. 6 schematically shows diagram of data packets according to an embodiment of the present invention.

The diagram of FIG. 6 shows frequency (the ordinate) of data packets 24, 25, 26 over time (the abscissa). The data packets 24, 25, 26 with the same number pertain to one single virtual entity, like a virtual mobile device or base station.

The data packets 24, 25, 26 are sequentially generated all at the same frequency. After all data packets 24, 25, 26 have been generated, the sequence repeats again until the test ends.

If only the content of the data packets 24, 25, 26 changes, but the frequency is the same for all data packets 24, 25, 26, when reconfiguring, it is enough to reconfigure the signal generator 12, as the test interface 13 is already configured for the respective frequency.

Figure 7:
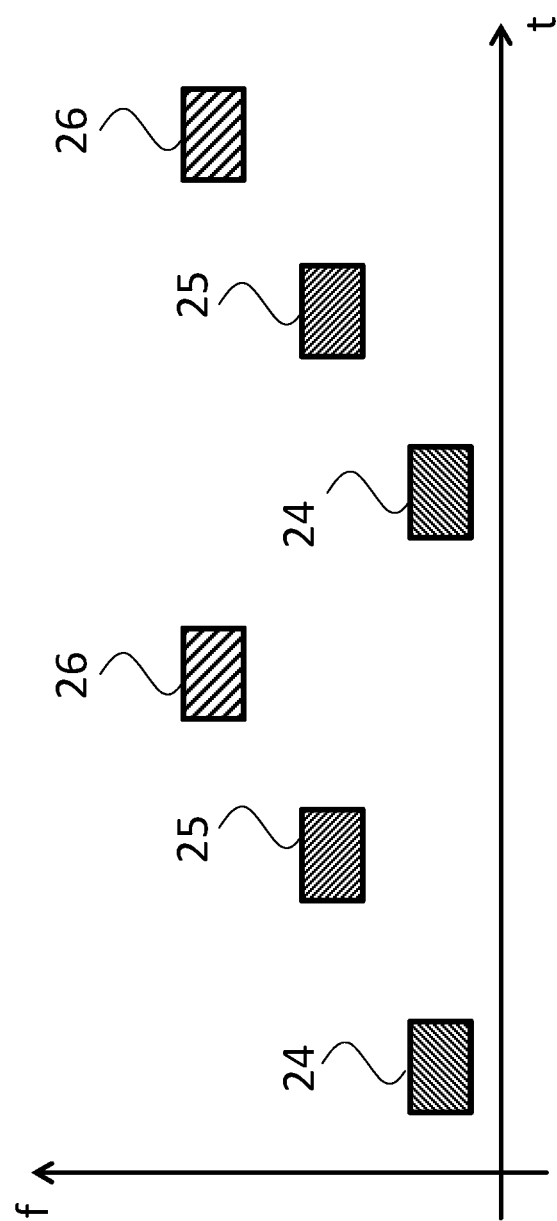
FIG. 7 schematically shows another diagram of data packets according to an embodiment of the present invention.

An alternative scheme is shown in FIG. 7, where only the data packets 24, 25, 26 of a single virtual entity are generated with the same frequency. Data packets 24, 25, 26 of different virtual entities are generated with different, here increasing, frequencies.

It is to be understood, that it is also possible that at least some data packets 24, 25, 26 are simultaneously generated with different frequencies, depending on the capabilities of the signal generator 12 and the test interface 13.

Figure 8:
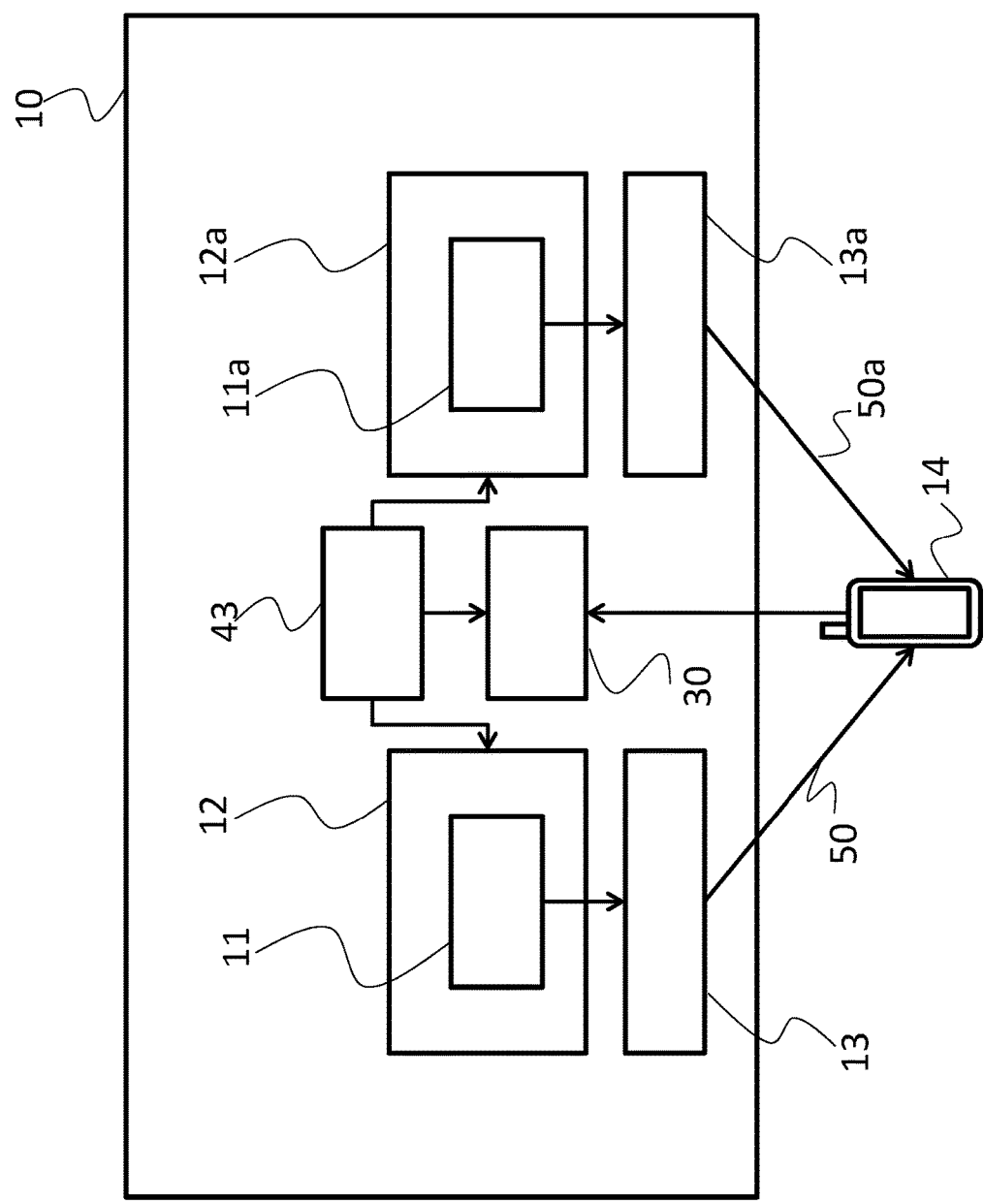
FIG. 8 schematically shows a block diagram of another embodiment of a test device according to an embodiment of the present invention.

FIG. 8 shows another embodiment of the test device 10, which is based on the test device 10 of FIG. 5 and comprises an additional transmit-receive unit 11a, an additional signal generator 12a, and an additional test interface 13a.

For testing mobile devices according to the 3GPP release standard, this configuration allows to execute complex test scenarios, which e.g. involve a plurality of different virtual base stations and/or virtual mobile devices.

Figure 9:
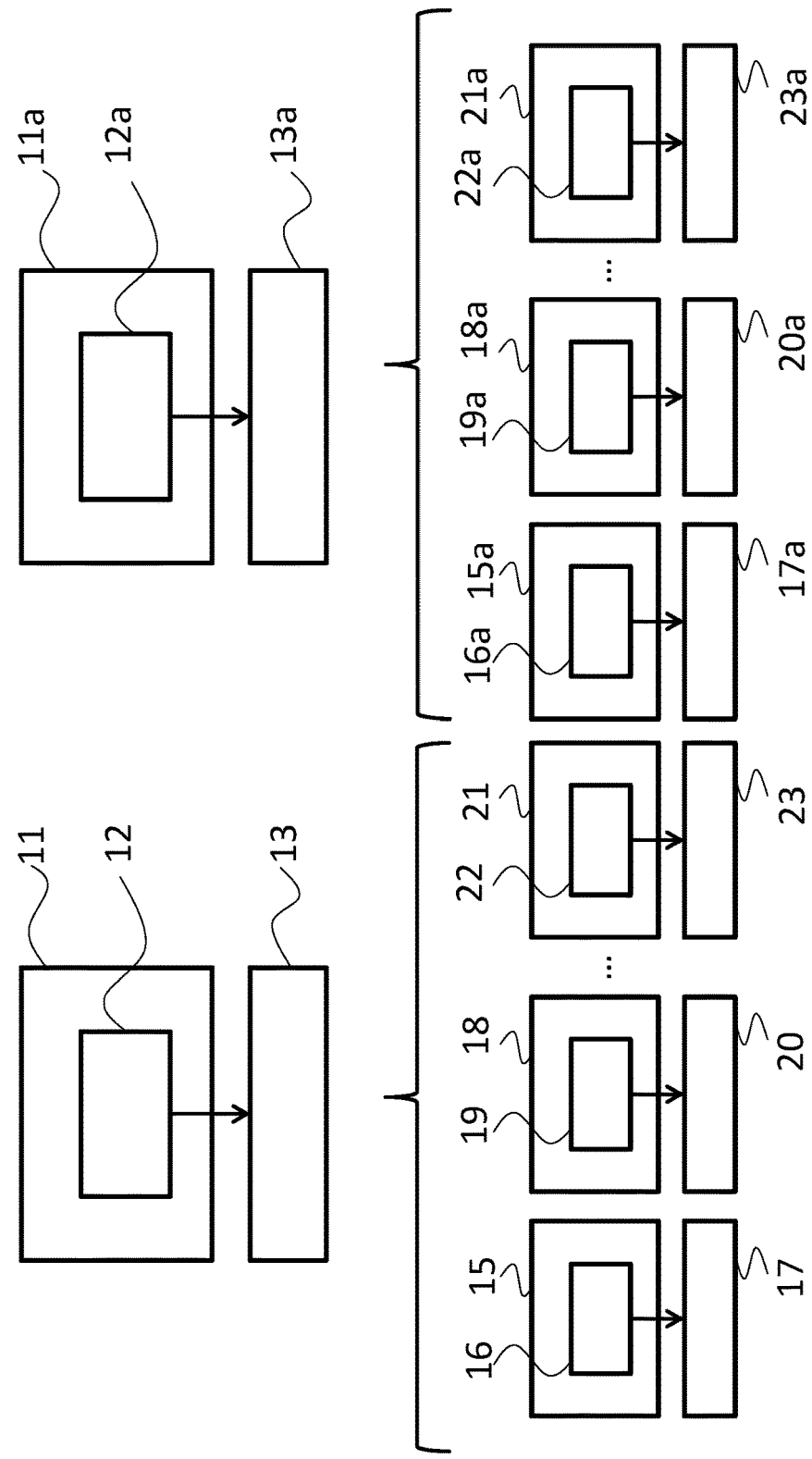
FIG. 9 schematically shows a block diagram showing the relation of real and virtual entities.

FIG. 9 shows, how every single transmit-receive unit 11, 11a with the signal generator 12, 12a and the test interface 13, 13a can emulate a plurality of different entities. Even though only three entities are shown for every transmit-receive unit 11, 11a, more are hinted at by three dots. As already explained above, the amount of different entities is only limited by the number of messages from different entities, which have to be produced and the time it takes to reconfigure a transmit-receive unit 11, 11a or test interface 13, 13a.

In a possible scenario, the signal generator 12 could e.g. generate signals of one or two LTE base stations, while the signal generator 12a could generate data packets of three or more mobile devices, e.g. direct communication or direct discovery messages or SIB19 packets.

Figure 10:
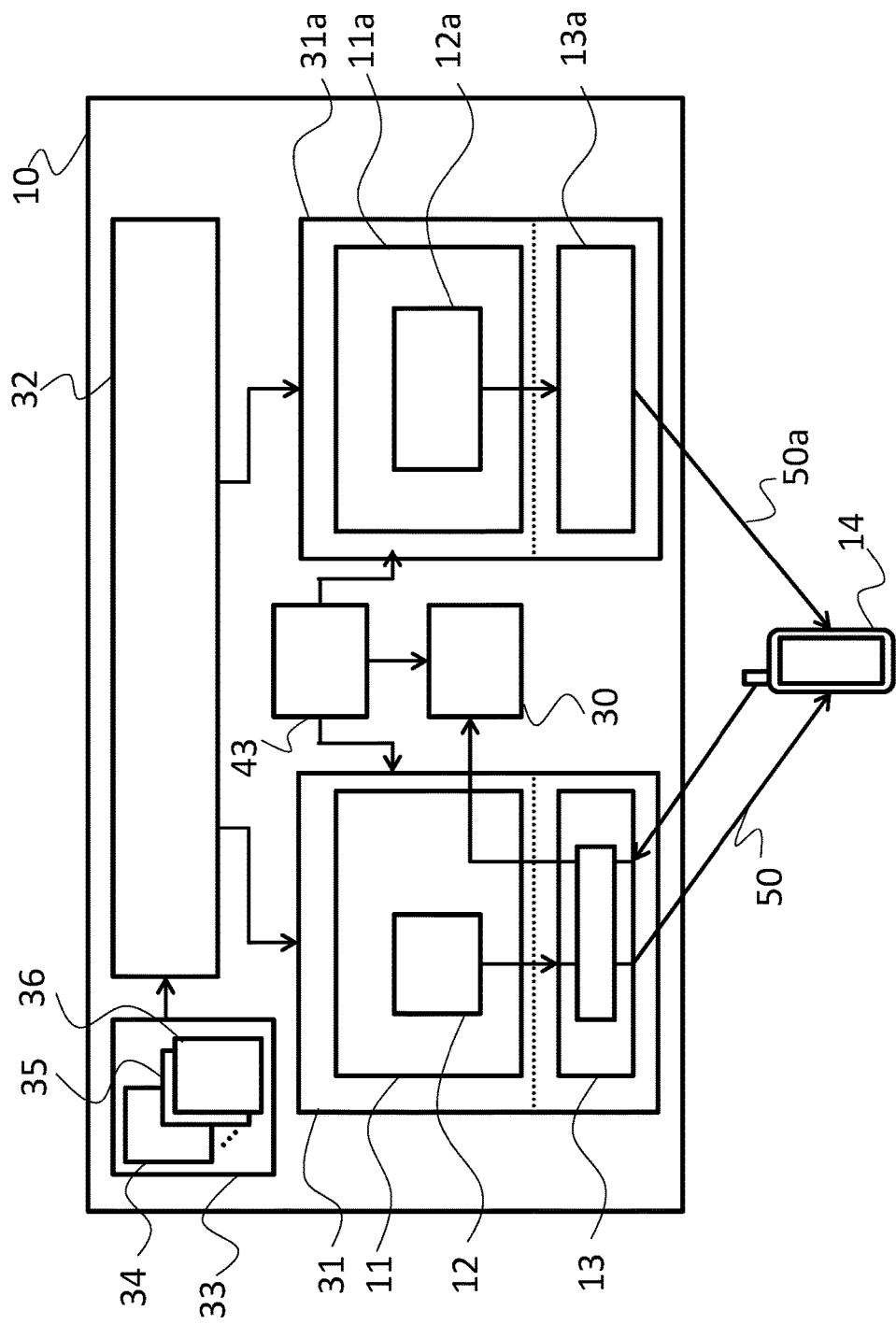
FIG. 10 schematically shows a block diagram of another embodiment of a test device according to an embodiment of the present invention.

FIG. 10 shows another test device 10. In the test device 10 of FIG. 10 two configurable logic devices 31, 31a, e.g. FPGAs or CPLDs or the like, are provided. In the present context the term "configurable logic device" refers to a device, which does not execute program code. Instead, in a "configurable logic device" a configuration is implemented directly as logic circuit.

A configuration processor 32 reads configurations 34, 35, 36 (more are hinted at by three dots) from the configuration memory 33 and configures the configurable logic devices 31, 31a accordingly. In the configurable logic devices 31, 31a the transmit-receive units 11, 11a with the signal generators 12, 12a are provided in a digital section. The test interfaces 13, 13a are provided in an analogue section of the configurable logic devices 31, 31a.

In FIG. 10 two of the configurations 34, 35, 36 comprise configuration data for the transmit-receive units 11, 11a, i.e. the digital sections of the configurable logic devices 31, 31a. A plurality of other configurations 34, 35, 36 comprise configuration data for the test interfaces 13, 13a, i.e. the analogue sections of the configurable logic devices 31, 31a.

That means that the transmit-receive units 11, 11a are only configured once, e.g. at startup of the test device 10 and comprise all the functionality needed to generate data packets of a plurality of different communication partners for the DUT 14. The test interfaces 13, 13a are then only reconfigured to provide the respective data packets at different frequencies or receive responses from the DUT 14 at different frequencies.

Figure 11:
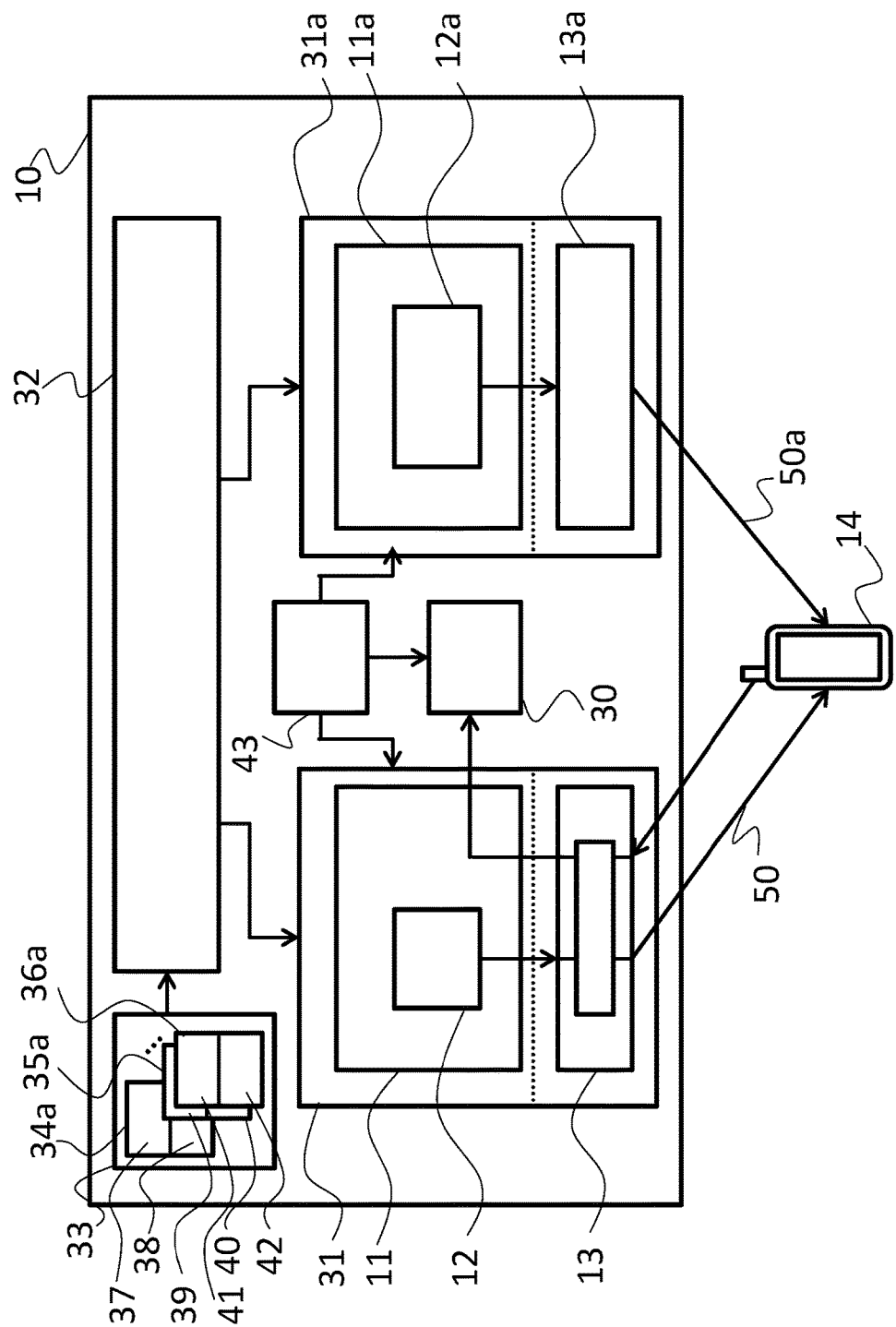
FIG. 11 schematically shows a block diagram of another embodiment of a test device according to an embodiment of the present invention.

FIG. 11 shows an another embodiment of a test device 10, where the configurations 34a, 35a, 36a each comprise first configuration data 37, 39, 41, and second configuration data 38, 40, 42.

The first configuration data 37, 39, 41 serves to configure the transmit-receive units 11, 11a, while the second configuration data 38, 40, 42 serves to configure the test interfaces 13, 13a.

Therefore, in the test device of FIG. 10 the complete configurable logic devices 31, 31a are reconfigured when a configuration 34a, 35a, 36a is loaded into the respective configurable logic device 31, 31a. This allows providing an increased number of functions especially in the transmit-receive units 11, 11a, because all the logic gates can be used for only one single communication partner of the DUT 14.

Figure 12:
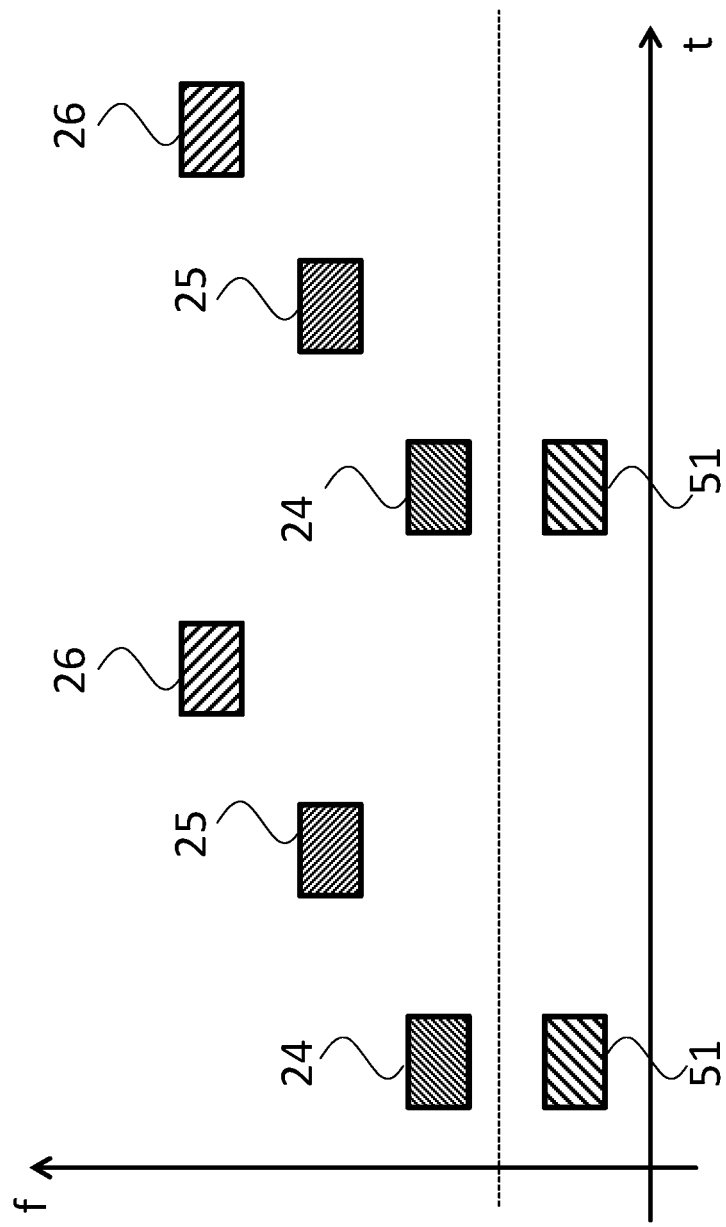
FIG. 12 schematically shows a diagram of data packets according to the embodiment of the present invention of FIG. 10 or 11.

The diagram of FIG. 12 shows frequency (the ordinate) over time (the abscissa) as in FIGS. 6 and 7 with data packets 24, 25, 26, and 51 as they could be emitted by a test device 10 of FIG. 10 or 11. In addition to the data packets 24, 25, 26 of FIGS. 6 and 7 a data packet 51 is transmitted to the DUT 14 together with the data packet 24, i.e. at the same time but another frequency.

Just as an example, the data packet 51 is a data packet 51, which emulates a LTE base station and is generated by the transmit-receive unit 31. The further resourses of transmit-receive unit 31 are not used to generate further data packets of other entities but e.g. to receive and evaluate the response signals from the DUT 14.

The data packets 24, 25, 26 can e.g. be generated by the transmit-receive unit 31a, which may only be used to generate e.g. SIB19 system information blocks from various virtual mobile user equipments.

Figure 13:
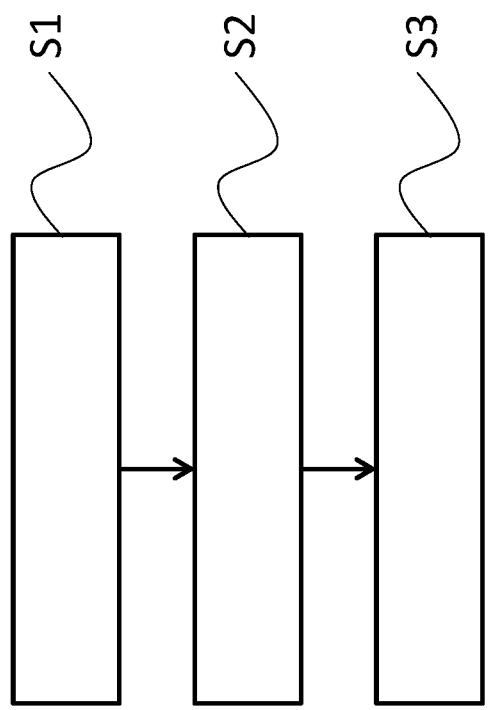
FIG. 13 schematically shows a flow-chart for illustrating an embodiment of a test method according to an embodiment of the present invention.

FIG. 13 schematically shows a flow-chart for illustrating an embodiment of a test method for testing a mobile user equipment according to an embodiment of the present invention.

The method starts with generating, S1, test signals 50, 50a, which represent at least two different communication partners of the mobile user equipment 14, e.g. with a transmit-receive unit 11, 11a. Further the test signals 50, 50a are transmitted to the mobile user equipment, S2. Finally the reaction of the mobile user equipment 14 to the transmitted test signals 50, 50a is analyzed, S3, based on a predefined test specification.

In the foregoing specification, the invention has been described with reference to specific examples of the embodiments of the invention. It will, however, be evident that various notifications and changes may be made therein without departing from the broader spirit and scope of the present invention as set forth in the appended claims. For example, the connections may be a type of connections, wired or wireless, suitable to transfer signals from or to the respective nodes, units or devices, for example via intermediate devices. Accordingly, unless implied or stated otherwise, the connections may be for example direct connections or indirect connections.

The devices implemented in the present invention are for the most part composed of electronic components and circuits known to those skilled in the art. Details of the circuitry and its components will not be explained in any greater extent than that considered necessary as illustrated above, for the understanding and appreciation of the underlying concept of the present invention and in order not to obfuscate or distract from the teachings of the present invention.

Moreover, the present invention is not limited to physical devices or units implemented in non-programmable hardware, but can also be applied in programmable devices or units able to perform the desired device functions or operating in accordance with suitable program code.

In the description, any reference signs shall not be construed as limiting the claims. The term "comprising" does not exclude the presence of other elements or steps listed in the claim. Furthermore, the terms "a" or "an" as used herein are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element. The same holds true for the use of definite articles. Unless stated otherwise, terms such as "first" and "second" are used to arbitrarily distinguish between the elements such terms describe. The mere fact that certain measures are recited in different claims does not indicate that a combination of these measures cannot be used to advantage. The order of method steps presented in a claim does not prejudice the order in which the steps can actually be carried out, unless specifically recited in the claim.

The skilled artisans will appreciate that elements in the figures are illustrated for simplicity and clarity and have not necessarily drawn to scale. For example, the chosen elements are only used to help to improve the understanding of the functionality and the arrangements of these elements in various embodiments of the present invention. Also, common but well-understood elements that are useful or necessary in a commercial and feasible embodiment are mostly not depicted in order to facilitate a less abstracted view of these various embodiments of the present invention.

The expression "user equipment" used in the present description can be understood to include any devices that have an integrated mobile communications functionality, irrespective of whether further functionalities are integrated in these devices. Thus, for instance, user equipment can be understood to include in addition to conventional mobile phones any other mobile communication terminals or mobile stations, such as smartphones, tablet PCs, mobile computers, navigational devices, PDAs (Personal Digital Assistants) and the like. Such user equipments are enabled to communicate wirelessly in a cellular communications network or wireless communication system, sometimes also referred to as a cellular radio system.

The cellular communications network covers a geographical area which is divided into cell areas, wherein each cell area is served by a transceiver base station, e.g. a Radio Base Station (RBS), which sometimes may be referred to as e.g. "eNB", "eNodeB", "NodeB", "B node", or BTS (Base Transceiver Station), depending on the technology and terminology used. NodeB or eNodeB may refer to a UMTS and LTE terminology. The transceiver base stations may be of different classes such as e.g. macro eNodeB, home eNodeB or pico base station, based on transmission power and thereby also cell size. A cell is the geographical area where radio coverage is provided by a specific transceiver base station at a specific site. One transceiver base station situated on this site, may serve one or several cells. Further, each transceiver base station may support one or several communication technologies. The transceiver base stations communicate over the air interface operating on radio frequencies with the user equipments within range of the base stations.

In 3rd Generation Partnership Project (3GPP) Long Term Evolution (LTE), base stations, which may be referred to as eNodeBs or even eNBs, may be directly connected to one or more core networks. UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for mobile stations. The 3GPP has undertaken to evolve further the UTRAN and GSM based radio access network technologies. According to 3GPP/GERAN, a mobile station has a multislot class, which determines the maximum transfer rate in the uplink and downlink direction. GERAN is an abbreviation for GSM EDGE Radio Access Network. EDGE is further an abbreviation for Enhanced Data rates for GSM Evolution.

Furthermore, the present invention shall also not be restricted to the above-stated protocols and standards, which are merely intended to aid explanation.

The invention claimed is:

1. A mobile communication test device for testing a mobile user equipment, the test device comprising:
   a number of transmit-receive units with a signal generator, wherein the signal generator of at least one transmit-receive unit generates test signals, which represent at least two different communication partners of the mobile user equipment,
   a number of test interfaces, which connect the transmit-receive units with the mobile user equipment and transmit the test signals to the mobile user equipment,
   a test processor, which analyses the reaction of the mobile user equipment to the transmitted test signals based on a predefined test specification,
   a number of configurable logic devices of the mobile communications test device, each of the configurable logic devices comprising at least one transmit-receive unit and/or at least one test interface,
   a configuration memory, which stores a number of configurations for the configurable logic devices, which when loaded into one of the configurable logic devices, cause the respective configurable logic device to generate test signals for a specific communication partner of the mobile user equipment, and
   a configuration processor, which is configured to reconfigure at least one of the configurable logic devices based on one of the configurations,
   wherein each of the configurable logic devices comprises:
      a digital section, which comprises at least one transmit-receive unit, wherein the digital section is configured only once, and
      a configurable analogue and/or radio frequency, RF, section, and
      the configuration processor is configured to reconfigure the at least one of the configurable logic devices based on a configuration schedule,
         wherein the configurations cause the configurable logic device to generate test signals with predetermined different content, and
         wherein the digital section is permanently configured only once, and the configurable analogue and/or RF section is periodically configured based on one of the configurations.

2. The mobile communication test device according to claim 1, wherein the test interfaces comprise a configurable analogue and/or RF section, which transforms the test signals generated by the signal generator into RF signals at a configurable frequency.

3. The mobile communication test device according to claim 2, wherein at least one of the test interfaces comprises a signal receiver, which receives signals generated by the mobile user equipment and transmits the received signals to the respective transmit-receive unit.

4. The mobile communication test device according to claim 3, wherein the signal receiver is embodied in the configurable analogue and/or RF section of the test interface and transforms RF signals received from the mobile user equipment into digital data signals and forwards said digital data signals to the respective transmit-receive unit.

5. The mobile communication test device according to claim 1, wherein the configurations each comprise first configuration data for the digital section of the configurable logic device and second configuration data for the analogue and/or RF section of the configurable logic device, wherein the configurations further cause the configurable logic device to generate test signals at different frequencies and/or at different points in time.

6. The mobile communication test device according to claim 1, wherein one configuration comprises first configuration data for the digital section of the configurable logic device, which when loaded into the configurable logic device causes the digital section of the configurable logic device to generate digital test signals for the different communication partners of the mobile user equipment.

7. The mobile communication test device according to claim 6, wherein a number of the configurations comprise second configuration data for the analogue and/or RF section of the configurable logic device which when loaded into the configurable logic device cause the analogue and/or RF section of the configurable logic device to transform the digital test signals into analogue test signals at different frequencies.

8. The mobile communication test device according to claim 1, wherein the signal generator of at least one transmit-receive unit generates test signals of a number of cell phone network base stations.

9. The mobile communication test device according to claim 1, wherein the signal generator of at least one transmit-receive unit generates test signals of a number of mobile user equipment, wherein the test signals include Direct Discovery and/or Direct Communication messages.

10. A mobile communication test method for testing a mobile user equipment, the test method comprising:
    generating test signals, which represent at least two different communication partners of the mobile user equipment with a transmit-receive unit,
    transmitting the test signals to the mobile user equipment,
    analyzing the reaction of the mobile user equipment to the transmitted test signals based on a predefined test specification,
    wherein the generating and transmitting are performed in a number of configurable logic devices of a mobile communications test device, each of the configurable logic devices comprising at least one transmit-receive unit and/or at least one test interface,
    storing a number of configurations for the configurable logic devices, which, when loaded into one of the configurable logic devices, cause the respective configurable logic device to generate test signals for a specific communication partner of the mobile user equipment, and
    periodically reconfiguring each of the configurable logic devices based on one of the configurations, and based on a configuration schedule,
    wherein when generating test signals, digital signal processing is performed in a digital section of one of the configurable logic devices, and analogue signal and/or radio frequency, RF, signal processing is performed in an analogue and/or RF section of one of the configurable logic devices,
    wherein the digital section is permanently configured only once, and the analogue and/or RF section is periodically reconfigured based on one of the configurations,
    wherein the configurations cause the configurable logic device to generate test signals with predetermined different content.

11. The method according to claim 10, further comprising transforming the test signals into RF signals for transmission to the mobile user equipment.

12. The method according to claim 10, further comprising receiving signals generated by the mobile user equipment.

13. The method according to claim 12, further comprising transforming RF signals received from the mobile user equipment into digital data signals and forwarding said digital data signals to a signal receiver.

14. The method according to claim 10, wherein the configurations comprise first configuration data for a digital section of the configurable logic device and second configuration data for the analogue and/or RF section of the configurable logic device, wherein the configurations cause the configurable logic device to generate test signals at different frequencies and/or at different points in time, or
   wherein one configuration comprises first configuration data for the digital section of the configurable logic device, which, when loaded into the configurable logic device, causes the digital section of the configurable logic device to generate digital test signals for different communication partners of the mobile user equipment, and wherein a number of the configurations comprise second configuration data for the analogue and/or RF section of the configurable logic device, which, when loaded into the configurable logic device, cause the analogue and/or RF section of the configurable logic device to transform the digital test signals into analogue test signals at different frequencies.

15. The method according to claim 10, wherein generating test signals comprises generating at least one test signal of a cell phone network base station.

16. The method according to claim 10, wherein generating test signals comprises generating test signals of a mobile user equipment, especially wherein the test signals include Direct Discovery Messages.

* * * * *